United States Patent
Kubo et al.

(10) Patent No.: US 12,534,635 B2
(45) Date of Patent: Jan. 27, 2026

(54) AQUEOUS COATING COMPOSITION

(71) Applicant: KANSAI PAINT CO., LTD., Amagasaki (JP)

(72) Inventors: Yoshitaka Kubo, Miyoshi (JP); Yusuke Mizutani, Miyoshi (JP); Takuya Inagaki, Miyoshi (JP); Gen Yokota, Miyoshi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 658 days.

(21) Appl. No.: 17/631,777

(22) PCT Filed: Jun. 8, 2020

(86) PCT No.: PCT/JP2020/022557
§ 371 (c)(1),
(2) Date: Jan. 31, 2022

(87) PCT Pub. No.: WO2021/024604
PCT Pub. Date: Feb. 11, 2021

(65) Prior Publication Data
US 2022/0282112 A1 Sep. 8, 2022

(30) Foreign Application Priority Data
Aug. 2, 2019 (JP) .................................. 2019-143045

(51) Int. Cl.
*C09D 133/08* (2006.01)
*C09D 5/08* (2006.01)
*C09D 161/28* (2006.01)
*C09D 167/04* (2006.01)

(52) U.S. Cl.
CPC ............ *C09D 133/08* (2013.01); *C09D 5/08* (2013.01); *C09D 161/28* (2013.01); *C09D 167/04* (2013.01)

(58) Field of Classification Search
CPC ............... C09D 133/08; C09D 133/10; C09D 133/066; C09D 167/00; C09D 167/02; C09D 167/025; C09D 167/03; C09D 167/04; C09D 167/07; C09D 167/08; C09D 161/28
See application file for complete search history.

(56) References Cited

U.S. PATENT DOCUMENTS

| | | | |
|---|---|---|---|
| 5,780,530 A | * | 7/1998 | Mizutani ............ C09D 133/066 524/588 |
| 8,008,394 B2 | | 8/2011 | Stricker et al. |
| 8,197,905 B2 | | 6/2012 | Huybrechts et al. |
| 9,988,554 B2 | | 6/2018 | Watkins et al. |
| 10,190,015 B2 | | 1/2019 | Lloyd et al. |
| 10,239,998 B2 | | 3/2019 | Willumstad et al. |
| 10,626,293 B2 | | 4/2020 | Letko et al. |

FOREIGN PATENT DOCUMENTS

| | | | |
|---|---|---|---|
| JP | S52-107029 A | | 9/1977 |
| JP | 2002088296 A | * | 3/2002 |
| JP | 2002-308993 A | | 10/2002 |
| JP | 2007-009059 A | | 1/2007 |
| JP | 2008274045 A | | 11/2008 |
| JP | 2014-009288 A | | 1/2014 |
| JP | 2014-125558 A | | 7/2014 |
| JP | 2015-140419 A | | 8/2015 |
| TW | 201341488 A | | 10/2013 |
| WO | WO-2012/036183 A1 | | 3/2012 |

OTHER PUBLICATIONS

International Search Report Japanese Patent Office, PCT/JP2020/022557, dated Jul. 21, 2020.
Wikipedia article dated Jun. 12, 2018, titled "Molecular mass", obtained from the Internet archive, "Wayback machine" (https://web.archive.org/web/20180619204912/https://en.wikipedia.org/wiki/Molecular_mass.

* cited by examiner

*Primary Examiner* — Jeffrey S Lenihan
(74) *Attorney, Agent, or Firm* — MARSHALL, GERSTEIN & BORUN LLP

(57) ABSTRACT

The present invention provides an aqueous coating composition which is capable of forming a coating film that has excellent cissing resistance and water resistance. An aqueous coating composition which contains (A) at least one hydroxyl group-containing resin that is selected from among (A1) hydroxyl group-containing acrylic resins and (A2) hydroxyl group-containing polyester resins, (B) an oligomer and (C) an alkyl etherified melamine resin, wherein: the oligomer (B) has a number average molecular weight within the range of from 200 to 800 and a solubility parameter within the range of from 10.0 to 13.5; and the molar ratio of methyl groups to butyl groups in the alkyl etherified melamine resin (C), namely (methyl group)/(butyl group) molar ratio is from 50/50 to 0/100.

19 Claims, No Drawings

AQUEOUS COATING COMPOSITION

CROSS REFERENCE TO RELATED APPLICATIONS

This application is a U.S. national stage of International Application No. PCT/JP2020/022557, filed Jun. 8, 2020, which claims the benefit of Japanese Patent Application No. 2019-143045, filed Aug. 2, 2019, the entire contents of each of which are fully incorporated herein by reference.

FIELD

The present invention relates to an aqueous coating composition.

BACKGROUND

For conventional intermediate coating materials and top coating materials for automobile exterior plates it is common to use aqueous coating materials comprising base resins such as acrylic resins or polyester resins having functional groups such as hydroxyl or carboxyl groups, and melamine resins as crosslinking agents.

Many of the melamine resins used are water-soluble melamine resins with relatively high methyl group contents and excellent water dispersibility, but in recent years the use of hydrophobic melamine resins with relatively high butyl group contents has been investigated. Aqueous coating materials comprising such hydrophobic melamine resins exhibit superior film performance such as water resistance compared to aqueous coating materials comprising water-soluble melamine resins, but the low compatibility of hydrophobic melamine resins with the medium of water has led to problems, since the use of hydrophobic melamine resins can sometimes result in cissing.

PTL 1 describes an aqueous resin dispersion comprising a reaction product obtained by heat treating 5 to 70 wt % of an acrylic resin (A), 10 to 90 wt % of a hydrophobic melamine resin (B) and 0 to 50 wt % of a polyester resin (C), wherein the mixture of component (A), component (B) and component (C) undergoes a thickening increase of 20 to 200% before and after heat treatment. The same publication teaches that the aqueous resin dispersion has excellent water dispersibility, and that a coating film formed from the aqueous resin dispersion has an excellent finished appearance and excellent water resistance. However, the aqueous resin dispersion has sometimes been less than satisfactory in terms of cissing resistance.

PTL 2 describes an aqueous coating composition comprising, as the main film-forming component, a co-condensation composition with 100 parts by weight of an oil-free alkyd resin with a molecular weight of 500 to 10,000, an acid value of 20 to 100 and a hydroxyl value of 50 to 200 and 5 to 70 parts by mass of a water-insoluble amino resin that is compatible with the resin, it being stated that using the aqueous coating composition can produce an excellent coating film with satisfactory interlayer adhesion and no coating defects such as cissing. However, the coating films formed from this aqueous coating composition have sometimes been less than satisfactory in terms of water resistance.

CITATION LIST

Patent Literature

[PTL 1] Japanese Unexamined Patent Publication No. 2002-308993

[PTL 2] Japanese Unexamined Patent Publication SHO No. 52-107029

SUMMARY

Technical Problem

In light of the circumstances described above, it is an object of the present invention to provide an aqueous coating composition that can form a coating film with excellent cissing resistance and water resistance.

Solution to Problem

As a result of avid research with the goal of achieving the aforestated object, the present inventors have found that the object can be achieved by an aqueous coating composition comprising (A) one or more hydroxyl group-containing resins selected from among (A1) hydroxyl group-containing acrylic resins and (A2) hydroxyl group-containing polyester resins, (B) an oligomer and (C) an alkyl etherified melamine resin, wherein the oligomer (B) has a number-average molecular weight in the range of 200 to 800 and a solubility parameter in the range of 10.0 to 13.5, and the molar ratio of methyl groups and butyl groups in the alkyl etherified melamine resin (C) is 50/50 to 0/100 as the (methyl group)/(butyl group) molar ratio.

The present invention relates to an aqueous coating composition and a method for forming a multilayer coating film, and includes the following embodiments.

1. An aqueous coating composition comprising (A) one or more hydroxyl group-containing resins selected from among (A1) hydroxyl group-containing acrylic resins and (A2) hydroxyl group-containing polyester resins, (B) an oligomer and (C) an alkyl etherified melamine resin, wherein the oligomer (B) has a number-average molecular weight in the range of 200 to 800 and a solubility parameter in the range of 10.0 to 13.5, and the molar ratio of methyl groups and butyl groups in the alkyl etherified melamine resin (C) is 50/50 to 0/100 as the (methyl group)/(butyl group) molar ratio.

2. The aqueous coating composition according to 1., wherein the number-average molecular weight of the oligomer (B) is in the range of 200 to 500.

3. The aqueous coating composition according to 1. or 2., wherein the solubility parameter of the oligomer (B) is in the range of 10.7 to 13.5.

4. The aqueous coating composition according to any one of 1. to 3., wherein the molar ratio of methyl groups and butyl groups in the alkyl etherified melamine resin (C) is 30/70 to 0/100 as the (methyl group)/(butyl group) molar ratio.

5. A method for forming a multilayer coating film, comprising applying an aqueous coating composition according to any one of 1. to 4. above onto an article to be coated to form a base coating film, and applying a clear coating composition (Z) on the base coating film to form a clear coating film.

Advantageous Effects of Invention

The aqueous coating composition of the invention allows formation of coating films with excellent cissing resistance and water resistance.

DESCRIPTION OF EMBODIMENTS

The aqueous coating composition of the invention will now be explained in detail.

The aqueous coating composition of the invention (hereunder also referred to simply as "coating material") comprises (A) one or more hydroxyl group-containing resins selected from among (A1) hydroxyl group-containing acrylic resins and (A2) hydroxyl group-containing polyester resins, (B) an oligomer and (C) an alkyl etherified melamine resin, wherein the oligomer (B) has a number-average molecular weight in the range of 200 to 800 and a solubility parameter in the range of 10.0 to 13.5, and the molar ratio of methyl groups and butyl groups in the alkyl etherified melamine resin (C) is 50/50 to 0/100 as the (methyl group)/(butyl group) molar ratio.

For the present purpose, "aqueous coating material" is a term used in contrast to "organic solvent-based coating material", and generally refers to a coating material comprising a coating film-forming resin or pigment dispersed and/or dissolved in water or a medium composed mainly of water (an aqueous medium). An organic solvent-based coating material is a coating material wherein the solvent used contains substantially no water, or wherein all or virtually all of the solvent used is an organic solvent.

Hydroxyl Group-Containing Resin (A)

The hydroxyl group-containing resin (A) of the invention is at least one hydroxyl group-containing resin selected from among hydroxyl group-containing acrylic resins (A1) and hydroxyl group-containing polyester resins (A2).

Hydroxyl Group-Containing Acrylic Resin (A1)

The hydroxyl group-containing acrylic resin (A1) used may be a water-soluble or water-dispersible acrylic resin which is conventionally known for use in aqueous coating materials.

The hydroxyl group-containing acrylic resin (A1) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as solution polymerization in an organic solvent or emulsion polymerization in water.

The hydroxyl group-containing polymerizable unsaturated monomer is a compound having one or more hydroxyl groups and polymerizable unsaturated bonds each in the molecule. Specific examples for the hydroxyl group-containing polymerizable unsaturated monomer include monoesterified products of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; c-caprolactone-modified forms of the monoesterified products of (meth)acrylic acid and dihydric alcohols of 2 to 8 carbon atoms; N-hydroxymethyl (meth)acrylamide; and allyl alcohols; as well as (meth)acrylates having polyoxyethylene chains with hydroxyl groups at the molecular ends. However, monomers qualifying as "(xvii) polymerizable unsaturated monomers with an ultraviolet absorbing functional group" as mentioned below are to be defined as "other polymerizable unsaturated monomers that are copolymerizable with hydroxyl group-containing polymerizable unsaturated monomers", and are excluded from "hydroxyl group-containing polymerizable unsaturated monomers" for the invention. These may be used either alone or in combinations of two or more.

Examples of other polymerizable unsaturated monomers that are copolymerizable with the hydroxyl group-containing polymerizable unsaturated monomer and that may be used include the following monomers (i) to (xx). These polymerizable unsaturated monomers may be used alone or in combinations of two or more.

(i) Alkyl or cycloalkyl (meth)acrylates: For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate and the like.

(ii) Polymerizable unsaturated monomers with isobornyl groups: Monomers such as isobornyl (meth)acrylate.

(iii) Polymerizable unsaturated monomers with adamantyl groups: Adamantyl (meth)acrylate and the like.

(iv) Polymerizable unsaturated monomers with tricyclodecenyl groups: Tricyclodecenyl (meth)acrylate and the like.

(v) Aromatic ring-containing polymerizable unsaturated monomers: Monomers such as benzyl (meth)acrylate, styrene, α-methyl styrene and vinyltoluene.

(vi) Polymerizable unsaturated monomers with alkoxysilyl groups: Vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like.

(vii) Polymerizable unsaturated monomers with fluorinated alkyl groups: Perfluoroalkyl (meth)acrylates such as perfluorobutylethyl (meth)acrylate and perfluorooctylethyl (meth)acrylate, and fluoroolefins and the like.

(viii) Polymerizable unsaturated monomers with photopolymerizable functional groups such as maleimide groups.

(ix) Vinyl compounds: N-Vinylpyrrolidone, ethylene, butadiene, chloroprene, vinyl propionate, vinyl acetate and the like.

(x) Carboxyl group-containing polymerizable unsaturated monomers: Monomers such as (meth)acrylic acid, maleic acid, crotonic acid and β-carboxyethyl (meth)acrylate.

(xi) Nitrogen-containing polymerizable unsaturated monomers: (Meth)acrylonitrile, (meth)acrylamide, N,N-dimethylaminoethyl (meth)acrylate, N,N-di ethylaminoethyl (meth)acrylate, N,N-dimethylaminopropyl (meth)acrylamide, methylenebis(meth)acrylamide, ethylenebis(meth)acrylamide, and glycidyl (meth)acrylate and amine compound addition products and the like.

(xii) Polymerizable unsaturated monomers with two or more polymerizable unsaturated groups in the molecule: Monomers such as allyl (meth)acrylate, ethylene glycol di(meth)acrylate, 1,4-butanediol di(meth)acrylate, neopentyl glycol di(meth)acrylate and 1,6-hexanediol di(meth)acrylate.

(xiii) Epoxy group-containing polymerizable unsaturated monomers: Monomers such as glycidyl (meth)acrylate, β-methylglycidyl (meth)acrylate, 3,4-epoxycyclohexylmethyl (meth)acrylate, 3,4-epoxycyclohexyl ethyl (meth)acrylate, 3,4-epoxycyclohexylpropyl (meth)acrylate and allyl glycidyl ether.

(xiv) (Meth)acrylates having polyoxyethylene chains with alkoxy groups at the molecular ends.

(xv) Polymerizable unsaturated monomers with sulfonic acid groups: 2-Acrylamide-2-methylpropanesulfonic acid, 2-sulfoethyl (meth)acrylate, allylsulfonic acid, 4-styrenesulfonic acid and the like; and sodium salts and ammonium salts of these sulfonic acids, and the like.

(xvi) Polymerizable unsaturated monomers with phosphate groups: Acid phosphooxyethyl (meth)acrylate, acid phosphooxypropyl (meth)acrylate, acid phosphooxypoly(oxyethylene)glycol (meth)acrylate, acid phosphooxypoly(oxypropylene)glycol (meth)acrylate, and the like.

(xvii) Polymerizable unsaturated monomers with ultraviolet absorbing functional groups: Monomers such as 2-hydroxy-4-(3-methacryloyloxy-2-hydroxypropoxy)benzophenone, 2-hydroxy-4-(3-acryloyloxy-2-hydroxypropoxy)benzophenone, 2,2ʹ-dihydroxy-4-(3-methacryloyloxy-2-hydroxypropoxy)benzophenone, 2,2ʹ-dihydroxy-4-(3-acryloyloxy-2-hydroxypropoxy)benzophenone and 2-[2-hydroxy-5-[2-(methacryloyloxy)ethyl]phenyl]-2H-benzotriazole.

(xviii) Light-stable polymerizable unsaturated monomers: Monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloyl amino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine.

(xix) Polymerizable unsaturated monomers with carbonyl groups: Monomers such as acrolein, diacetoneacrylamide, diacetonemethacrylamide, acetoacetoxyethyl methacrylate, formyl styrol and vinylalkyl ketones with 4 to 7 carbon atoms (for example, vinylmethyl ketone, vinylethyl ketone and vinylbutyl ketone).

(xx) Polymerizable unsaturated monomers with acid anhydride groups: Monomers such as maleic anhydride, itaconic anhydride and citraconic anhydride.

As used herein, "polymerizable unsaturated group" means an unsaturated group that can participate in radical polymerization. Examples of such polymerizable unsaturated groups include vinyl and (meth)acryloyl.

Also as used herein, "(meth)acrylate" refers to acrylate or methacrylate. The term "(meth)acrylic acid" refers to acrylic acid or methacrylic acid. The term "(meth)acryloyl" refers to acryloyl or methacryloyl. The term "(meth)acrylamide" refers to acrylamide or methacrylamide.

The use proportion of the hydroxyl group-containing polymerizable unsaturated monomer when producing the hydroxyl group-containing acrylic resin (A1) is preferably 1 to 50 mass %, more preferably 1 to 40 mass % and even more preferably 1 to 30 mass %, based on the total amount of the monomer components.

From the viewpoint of the curability, chipping resistance, adhesiveness and finished appearance of the obtained coating film, the hydroxyl group-containing acrylic resin (A1) has a hydroxyl value of preferably 1 to 200 mgKOH/g, more preferably 2 to 180 mgKOH/g and even more preferably 5 to 150 mgKOH/g.

Also, from the viewpoint of the storage stability of the coating material and the water resistance of the obtained coating film, the hydroxyl group-containing acrylic resin (A1) has an acid value of preferably 1 to 150 mgKOH/g, more preferably 5 to 100 mgKOH/g and even more preferably 5 to 80 mgKOH/g.

When the aqueous coating composition contains the hydroxyl group-containing acrylic resin (A1), the content of the hydroxyl group-containing acrylic resin (A1) is preferably 2 to 70 mass %, more preferably 5 to 50 mass % and even more preferably 10 to 40 mass %, based on the resin solid content of the aqueous coating composition.

Hydroxyl Group-Containing Polyester Resin (A2)

The hydroxyl group-containing polyester resin (A2) used may be a water-soluble or water-dispersible polyester resin which is conventionally known for use in aqueous coating materials.

The hydroxyl group-containing polyester resin (A2) can generally be produced by esterification reaction or transesterification reaction between an acid component and an alcohol component.

The acid component used may be a compound that is commonly used as an acid component for production of polyester resins. Examples of such acid components include aliphatic polybasic acids, alicyclic polybasic acids and aromatic polybasic acids.

The aliphatic polybasic acid will generally be an aliphatic compound having two or more carboxyl groups in the molecule, an acid anhydride of such an aliphatic compound, or an ester of such an aliphatic compound. Examples for aliphatic polybasic acids include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of such aliphatic polybasic carboxylic acids; and esterified products of such aliphatic polybasic carboxylic acids with lower alkyl groups of about 1 to 4 carbon atoms. The aliphatic polybasic acid used may be one type or a combination of two or more types.

The aliphatic polybasic acid used is preferably adipic acid and/or adipic anhydride, from the viewpoint of smoothness of the coating film that is to be obtained.

The alicyclic polybasic acid will generally be a compound having one or more alicyclic structures and two or more carboxyl groups in the molecule, or an acid anhydride of such a compound or an esterified form of such a compound. An alicyclic structure is mainly a 4- to 6-membered cyclic structure. Examples of alicyclic polybasic acids include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; and esterified products of these alicyclic polybasic carboxylic acids with lower alkyl groups of about 1 to 4 carbon atoms. The alicyclic polybasic acid used may be one type or a combination of two or more types.

From the viewpoint of smoothness of the coating film that is to be obtained, the alicyclic polybasic acid used is preferably 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid or 4-cyclohexene-1,2-dicarboxylic anhydride, among which 1,2-cyclohexanedicarboxylic acid and/or 1,2-cyclohexanedicarboxylic anhydride are more preferably used.

An aromatic polybasic acid is generally an aromatic compound having two or more carboxyl groups in the molecule, an acid anhydride of such an aromatic compound or an esterified form of such an aromatic compound, and examples include aromatic polybasic carboxylic acids such as phthalic acid, isophthalic acid, terephthalic acid, naphthalenedicarboxylic acid, 4,4ʹ-iphenyldicarboxylic acid, trimellitic acid and pyromellitic acid; anhydrides of such aromatic polybasic carboxylic acids; and lower alkyl esterified products of such aromatic polybasic carboxylic acids, with about 1 to 4 carbon atoms. The aromatic polybasic acid used may be one type or a combination of two or more types.

The aromatic polybasic acid used is preferably phthalic acid, phthalic anhydride, isophthalic acid, trimellitic acid or trimellitic anhydride.

Acid components other than the aforementioned aliphatic polybasic acids, alicyclic polybasic acids and aromatic polybasic acids may also be used. Such acid components are not particularly restricted, and examples include fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid. These acid components may be used either alone or in combinations of two or more.

As the alcohol component there may be suitably used a polyhydric alcohol having two or more hydroxyl groups in the molecule. Examples of polyhydric alcohols include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F and dimethylolpropionic acid; polylactone diols with lactone compounds such as c-caprolactone added to these dihydric alcohols; ester diol compounds such as bis(hydroxyethyl) terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as c-caprolactone added to these trihydric and greater alcohols; and fatty acid esterified glycerin.

Alcohol components other than the aforementioned polyhydric alcohols may also be used. Such alcohol components are not particularly restricted, and examples include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide, "CARDURA E10P" (trade name of Hexion, glycidyl ester of synthetic highly-branched saturated fatty acid), and the like.

The method for producing the hydroxyl group-containing polyester resin is not particularly restricted, and it may be a common method. For example, a hydroxyl group-containing polyester resin can be produced by a method of heating the acid component and the alcohol component under a nitrogen stream at about 150 to 250° C. for about 5 to 10 hours, for esterification reaction or transesterification reaction between the acid component and alcohol component.

When the acid component and alcohol component are subjected to esterification reaction or transesterification reaction, they may be added all at once to the reactor, or one or both may be added in separate portions. Alternatively, after the hydroxyl group-containing polyester resin has first been synthesized, an acid anhydride may be reacted with the obtained hydroxyl group-containing polyester resin for half-esterification, to obtain a carboxyl group- and hydroxyl group-containing polyester resin. Also alternatively, after a carboxyl group-containing polyester resin has first been synthesized, the alcohol component may be added to obtain a hydroxyl group-containing polyester resin.

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be used as a catalyst for acceleration of the reaction.

The hydroxyl group-containing polyester resin may also be modified with a fatty acid, monoepoxy compound, polyisocyanate compound or acrylic resin either during or after preparation of the resin.

Examples as fatty acids that may be suitably used include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid and safflower oil fatty acid, and a preferred example for the monoepoxy compound is "CARDURA E10P" (trade name of Hexion, glycidyl ester of synthetic highly-branched saturated fatty acid).

Examples for the polyisocyanate compound include organic polyisocyanates, such as aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4 = methylenebis(cyclohexylisocyanate) and 1,3-(isocyanatomethyl)cyclohexane; aromatic diisocyanate compounds such as tolylene diisocyanate, xylylene diisocyanate and diphenylmethane diisocyanate; and trivalent and greater polyisocyanates such as lysine triisocyanate; as well as addition products of these organic polyisocyanates with polyhydric alcohols, low molecular weight polyester resins or water; and cyclized polymers formed between these organic polyisocyanates (for example, isocyanurates) and biuret-type addition products. These polyisocyanate compounds may be used alone or in mixtures of two or more.

The method used to modify the hydroxyl group-containing polyester resin with an acrylic resin may be a known method, and for example, it may be a method of polymerizing a mixture of a polymerizable unsaturated group-containing polyester resin and a polymerizable unsaturated monomer, or a method of reacting a hydroxyl group-containing polyester resin with an acrylic resin.

The hydroxyl group-containing polyester resin (A2) has a hydroxyl value of preferably 1 to 250 mgKOH/g, more preferably 2 to 200 mgKOH/g and even more preferably 5 to 200 mgKOH/g.

When the hydroxyl group-containing polyester resin (A2) also has a carboxyl group, the acid value is preferably 1 to 150 mgKOH/g, more preferably 2 to 100 mgKOH/g and even more preferably 3 to 80 mgKOH/g.

The weight-average molecular weight of the hydroxyl group-containing polyester resin (A2) is preferably 3,000 to 100,000, more preferably 4,000 to 50,000 and even more preferably 5,000 to 30,000.

As used herein, the average molecular weight is the value calculated from a chromatogram measured by gel permeation chromatography based on the molecular weight of standard polystyrene. An HLC8120GPC apparatus (product of Tosoh Corp.) was used for the gel permeation chromatography. Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 mL/min, detector: RI.

When the aqueous coating composition contains the hydroxyl group-containing polyester resin (A2), the content of the hydroxyl group-containing polyester resin (A2) is preferably 2 to 70 mass %, more preferably 5 to 50 mass % and even more preferably 10 to 40 mass %, based on the resin solid content of the aqueous coating composition.

Oligomer (B)

The oligomer (B) has a number-average molecular weight in the range of 200 to 800 and a solubility parameter in the range of 10.0 to 13.5.

If the number-average molecular weight of the oligomer (B) is 200 or greater it will be possible to obtain a coating film with excellent water resistance, and if it is 800 or lower it will be possible to obtain a coating film with excellent cissing resistance. From the viewpoint of water resistance and cissing resistance, the number-average molecular weight of the oligomer (B) is in the range of preferably 200 to 500, more preferably 200 to 300 and most preferably 200 to 280.

If the solubility parameter of the oligomer (B) is 10.0 or greater it will be possible to obtain a coating film with excellent water resistance, and if it is 13.5 or lower it will be possible to obtain a coating film with excellent cissing resistance. From the viewpoint of cissing resistance and water resistance, the solubility parameter of the oligomer (B) is in the range of preferably 10.7 to 13.5 and more preferably 11.0 to 13.5.

Specific examples for the oligomer (B) include polyoxyalkylene glycols such as polyoxyethylene glycol, polyoxypropylene glycol and polyoxytetramethylene glycol, and their etherified forms. Polyoxypropylene glycol and polyoxytetramethylene glycol are preferred among these, with polyoxytetramethylene glycol being more preferred.

The oligomer (B) used may be a commercial product. Examples of commercial products include "SANNIX GP250" (number-average molecular weight: 250, solubility parameter: 13.2), "SANNIX GP400" (number-average molecular weight: 400, solubility parameter: 11.5) and "SANNIX GP600" (number-average molecular weight: 600, solubility parameter: 10.6) (all polyoxypropylene glyceryl ethers by Sanyo Chemical Industries, Ltd.), "SANNIX PP200" (number-average molecular weight: 200, solubility parameter: 11.7) and "SANNIX PP400" (number-average molecular weight: 400, solubility parameter: 10.4) (both polyoxypropylene glycols by Sanyo Chemical Industries, Ltd.), "PTMG250" (number-average molecular weight: 250, solubility parameter: 11.4) and "PTMG650" (number-average molecular weight: 650, solubility parameter: 10.0) (both polyoxytetramethylene glycols by Mitsubishi Chemical Corp.).

The oligomer (B) used may be a single type or a combination of two or more types.

The solubility parameter can be calculated by the Fedors method. Calculation by the Fedors method is described in Polymer Engineering and Science, 14, (2), 147(1974).

The content of the oligomer (B) in the aqueous coating composition of the invention is preferably 1 to 20 mass %, more preferably 2 to 15 mass % and even more preferably 3 to 10 mass %, based on the resin solid content of the aqueous coating composition.

Alkyl Etherified Melamine Resin (C)

The alkyl etherified melamine resin (C) is a melamine resin in which the molar ratio of methyl groups and butyl groups is 50/50 to 0/100, as the (methyl group)/(butyl group) molar ratio.

A molar ratio of butyl groups with respect to methyl groups of 50 or greater will result in satisfactory water resistance for the obtained coating film. A more suitable butyl etherified melamine resin is one in which the molar ratio of methyl groups and butyl groups in the alkyl etherified melamine resin (C) is preferably 30/70 to 0/100, more preferably 10/90 to 0/100 and even more preferably 0/100, as the (methyl group)/(butyl group) molar ratio.

The alkyl etherified melamine resin (C) can be synthesized by conducting addition reaction or addition condensation reaction of an aldehyde such as formaldehyde, paraformaldehyde, acetaldehyde or benzaldehyde with a melamine, to produce a methylolated melamine resin, and then further methyl etherifying and/or butyl etherifying the methylol group portions with an alcohol.

The alcohol used for methyl etherification may be methyl alcohol, and the alcohol used for butyl etherification may be n-butyl alcohol or isobutyl alcohol.

The types and amounts of methyl alcohol, n-butyl alcohol and isobutyl alcohol used may be changed to adjust the molar ratio of methyl groups and butyl groups in the alkyl etherified melamine resin (C).

The alkyl etherified melamine resin (C) may also be a condensation product of an alkyl etherified melamine resin (high molecularized product obtained by condensation reaction of an alkyl etherified melamine resin).

The weight-average molecular weight of the alkyl etherified melamine resin (C) will usually be in the range of 400 to 6,000, and is preferably 500 to 4,000 or more preferably 600 to 3,000.

The alkyl etherified melamine resin (C) used may be a commercial product. Examples of commercial products include "CYMEL 203", "CYMEL 204", "CYMEL 250", "CYMEL 251", "CYMEL 1156" and "CYMEL 1158" (all by Allnex, Japan), and "U-VAN 20SE60" or "U-VAN 28-60" (both by Mitsui Chemicals, Inc.).

The alkyl etherified melamine resin (C) used may be a single one or a combination of two or more different ones.

A catalyst may also be used in the curing reaction between the hydroxyl group-containing resin and alkyl etherified melamine resin (C). Catalysts include sulfonic acids such as paratoluenesulfonic acid, dodecylbenzenesulfonic acid and dinonylnaphthalenesulfonic acid; alkylphosphoric acid esters such as monobutylphosphoric acid, dibutylphosphoric acid, mono-2-ethylhexylphosphoric acid and di-2-ethylhexylphosphoric acid; and amine salts of these acids.

The content of the alkyl etherified melamine resin (C) in the aqueous coating composition of the invention is preferably 1 to 60 mass %, more preferably 5 to 50 mass % and even more preferably 10 to 40 mass %, based on the resin solid content of the aqueous coating composition.

While the reason why a coating film with excellent water resistance and cissing resistance is obtained by the aqueous coating composition of the invention is not fully understood, it is conjectured that the relatively high molar ratio of butyl groups in the alkyl etherified melamine resin (C) of the aqueous coating composition increases the hydrophobicity of the formed coating film, thereby producing excellent water resistance. In addition, the relatively low number-average molecular weight and the relatively high solubility parameter of the oligomer (B) in the aqueous coating composition allows the oligomer (B) to dissolve in both the aqueous layer and oil layer. As a result, presumably the oligomer (B) acts as a compatibilizer preventing localization of the alkyl etherified melamine resin (C) in the aqueous coating composition, allowing a coating film with excellent cissing resistance to be obtained.

Other Components

If necessary, the aqueous coating composition of the invention may also comprise components other than at least one hydroxyl group-containing resin (A) selected from among hydroxyl group-containing acrylic resins (A1) and hydroxyl group-containing polyester resins (A2), an oligomer (B) and an alkyl etherified melamine resin (C). Examples of such components include resin components other than at least one hydroxyl group-containing resin (A) selected from among hydroxyl group-containing acrylic resins (A1) and hydroxyl group-containing polyester resins (A2), crosslinkable components other than an alkyl etherified melamine resin (C), pigments, organic solvents, dispersing agents, anti-settling agents, antifoaming agents, thickening agents, ultraviolet absorbers, light stabilizers and surface conditioners.

Examples of resin components other than at least one hydroxyl group-containing resin (A) selected from among hydroxyl group-containing acrylic resins (A1) and hydroxyl group-containing polyester resins (A2) include acrylic resins that do not contain hydroxyl groups, polyester resins that do not contain hydroxyl groups, polyurethane resins optionally containing hydroxyl groups, olefin resins optionally containing hydroxyl groups, and epoxy resins optionally containing hydroxyl groups.

Preferred among these from the viewpoint of water resistance of the obtained coating film are polyurethane resins optionally containing hydroxyl groups, with hydroxyl group-containing polyurethane resins being preferred.

The hydroxyl group-containing polyurethane resin may be a hydroxyl group-containing polyurethane resin obtained by reacting a polyol and a polyisocyanate compound.

Examples for the polyol include low-molecular-weight compounds including divalent alcohols such as ethylene glycol, diethylene glycol, propylene glycol, butylene glycol and hexamethylene glycol; and trihydric alcohols such as trimethylolpropane, glycerin and pentaerythritol. High-molecular-weight compounds include polyether polyols, polyester polyols, acrylic polyols and epoxy polyols. Polyether polyols include polyethylene glycol, polypropylene glycol and polytetramethylene glycol. Polyester polyols include polycondensates of alcohols such as the aforementioned divalent alcohols, with dibasic acids such as adipic acid, azelaic acid or sebacic acid; lactone-based ring-opening polymer polyols such as polycaprolactone, and polycarbonate diols. Carboxyl group-containing polyols such as 2,2-dimethylolpropionic acid and 2,2-dimethylolbutanoic acid may also be used.

Examples of polyisocyanates to be reacted with polyols include aliphatic polyisocyanates such as hexamethylene diisocyanate, trimethylhexamethylene diisocyanate, dimer acid diisocyanate and lysine diisocyanate; as well as biuret type adducts and isocyanurate ring adducts of these polyisocyanates; alicyclic diisocyanates such as isophorone diisocyanate, 4,4′-methylenebis(cyclohexylisocyanate), methylcyclohexane-2,4- (or -2,6-)diisocyanate, 1,3- (or 1,4-)di(isocyanatomethyl)cyclohexane, 1,4-cyclohexane diisocyanate, 1,3-cyclopentane diisocyanate and 1,2-cyclohexane diisocyanate, as well as biuret type adducts and isocyanurate ring adducts of these polyisocyanates; aromatic diisocyanate compounds such as xylylene diisocyanate, meta-xylylene diisocyanate, tetramethylxylylene diisocyanate, tolylene diisocyanate, 4,4′-diphenylmethane diisocyanate, 1,5-naphthalene diisocyanate, 1,4-naphthalene diisocyanate, 4,4-toluidine diisocyanate, 4,4′-diphenyl ether diisocyanate, (m-orp-)phenylene diisocyanate, 4,4′-iphenylene diisocyanate, 3,3′-imethyl-4,4′-biphenylene diisocyanate, bis(4-isocyanatophenyl)sulfone, isopropylidene bis(4-phenylisocyanate), as well as biuret type adducts and isocyanurate ring adducts of these polyisocyanates; and polyisocyanates having 3 or more isocyanate groups in the molecule, such as triphenylmethane-4,4′,4″-triisocyanate, 1,3,5-triisocyanatobenzene, 2,4,6-triisocyanatotoluene and 4,4′-imethyldiphenylmethane-2,2′,5,5′-tetraisocyanate, as well as biuret type adducts and isocyanurate ring adducts of these polyisocyanates.

When the aqueous coating composition of the invention comprises a hydroxyl group-containing polyurethane resin, the content of the hydroxyl group-containing polyurethane resin is preferably 1 to 40 mass %, more preferably 3 to 30 mass % and even more preferably 5 to 25 mass %, based on the resin solid content of the aqueous coating composition.

Since the hydroxyl group-containing resin (A) has a hydroxyl group, a crosslinkable component other than the alkyl etherified melamine resin (C) is preferably a compound that is reactive with hydroxyl groups. Examples of compounds that are reactive with hydroxyl groups include polyisocyanate compounds, blocked polyisocyanate compounds, and amino resins other than the alkyl etherified melamine resin (C).

For example, when the hydroxyl group-containing resin (A) has a crosslinkable functional group other than a hydroxyl group, the crosslinkable component used may be a compound that is reactive with the crosslinkable functional group other than a hydroxyl group. Specifically, when the hydroxyl group-containing resin (A) has a carboxyl group, for example, a carbodiimide group-containing compound may be used as the crosslinkable component.

The pigment used may be a color pigment, extender pigment or brightness pigment, for example. Such pigments may be used alone or in combinations of two or more.

When the aqueous coating composition of the invention comprises such a pigment, the content of the pigment may be in the range of generally 1 to 100 parts by mass, preferably 2 to 60 parts by mass and even more preferably 3 to 40 parts by mass, based on 100 parts by mass as the resin solid content in the aqueous coating composition.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like.

When the aqueous coating composition of the invention comprises such a color pigment, the content of the color pigment may be in the range of generally 1 to 80 parts by mass, preferably 5 to 50 parts by mass and more preferably 10 to 30 parts by mass, based on 100 parts by mass as the resin solid content in the aqueous coating composition.

Examples of extender pigments include barium sulfate, talc, clay, kaolin, barium carbonate, calcium carbonate, silica and alumina white. The extender pigment used is preferably barium sulfate from the viewpoint of the design property.

When the aqueous coating composition of the invention comprises such an extender pigment, the content of the extender pigment may be in the range of generally 50 parts by mass or lower, preferably 3 to 50 parts by mass and more preferably 5 to 30 parts by mass, based on 100 parts by mass as the resin solid content in the aqueous coating composition.

Examples of brightness pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica.

When the aqueous coating composition of the invention comprises such a brightness pigment, the content of the brightness pigment may be in the range of generally 1 to 80 parts by mass, preferably 5 to 50 parts by mass and more preferably 10 to 30 parts by mass, based on 100 parts by mass as the resin solid content in the aqueous coating composition.

Examples of organic solvents include ketone-based solvents such as acetone, methyl ethyl ketone and methyl isobutyl ketone; ester-based solvents such as ethyl acetate, butyl acetate, methyl benzoate, ethyl ethoxypropionate, ethyl propionate and methyl propionate; alcohol-based solvents such as isopropanol, n-butanol, isobutanol and 2-ethylhexanol; ether-based solvents such as tetrahydrofuran, dioxane and dimethoxyethane; glycol ether-based solvents such as ethyleneglycol monomethyl ether, ethyleneglycol monoethyl ether, diethyleneglycol monomethyl ether, propyleneglycol monomethyl ether acetate and 3-methoxybutyl acetate; and hydrocarbon-based solvents such as aromatic hydrocarbon-based solvents and aliphatic hydrocarbon-based solvents.

For use, the aqueous coating composition of the invention may be applied after adding water and/or an organic solvent for dilution to adjust it to the appropriate viscosity, as necessary.

The suitable viscosity will differ depending on the coating composition, and for example, when prepared using a No. 4 Ford cup viscometer, it may be a viscosity at 20° C. of usually about 20 to 60 seconds and preferably about 25 to 50 seconds. The solid concentration of the aqueous coating composition of the invention when applied will usually be about 5 to 50 mass % and is preferably about 10 to 40 mass %.

The aqueous coating composition of the invention may be either a one-pack type coating material or a multi-pack type coating material, but it is preferably a one-pack type coating material from the viewpoint of excellent productivity without a coating material mixing step, and of allowing maintenance of the coating machine to be simplified.

The aqueous coating composition of the invention may be coated onto an article to be coated by a known method such as air spray coating, airless spray coating, rotary atomizing coating or curtain coating, for example, and electrostatic application may also be carried out during the coating. Methods of air spray coating and rotary atomizing coating are preferred among these. Such coating methods may be carried out once or several times, until the desired film thickness is obtained.

The coating amount of the aqueous coating composition of the invention is usually preferred to be an amount that produces a cured film thickness of 3 to 30 µm, preferably 5 to 25 µm and more preferably 10 to 20 µm.

Method for Forming Multilayer Coating Film

The invention includes a method for forming a multilayer coating film, comprising applying an aqueous coating composition of the invention onto an article to be coated to form a base coating film, and then applying a clear coating material onto the base coating film to form a clear coating film.

The following methods 1 and 2 may be mentioned as preferred modes of the method for forming a multilayer coating film of the invention.

Method 1

A method for forming a multilayer coating film comprising:
(1) a step of applying an aqueous coating composition of the invention onto an article to be coated to form an uncured base coating film,
(2) a step of applying a clear coating composition (Z) onto the uncured base coating film to form an uncured clear coating film, and
(3) a step of heating the uncured base coating film and uncured clear coating film to simultaneously cure them.

Method 2

A method for forming a multilayer coating film comprising:
(1) a step of applying an intermediate coating composition onto an article to be coated to form an uncured intermediate coating film,
(2) a step of applying an aqueous coating composition of the invention onto the uncured intermediate coating film to form an uncured base coating film,
(3) a step of applying a clear coating composition (Z) onto the uncured base coating film to form an uncured clear coating film, and
(4) a step of heating the uncured intermediate coating film, base coating film and the uncured clear coating film to simultaneously cure them.

There are no particular restrictions on the article to be coated, and as examples there may be mentioned exterior plates of automobile bodies of passenger vehicles, trucks, motorcycles and buses; automobile parts; and exterior plates of consumer electric products such as cellular phones or audio devices. Preferred among these are exterior plates of automobile bodies, and automobile parts.

The material of the article to be coated is also not particularly restricted. Examples include metal materials such as iron, aluminum, brass, copper, tin, stainless steel, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various types of FRPs; inorganic materials such as glass, cement and concrete; wood materials; and fiber materials such as paper and fabrics.

Metal materials and plastic materials are preferred among these.

Surfaces of articles to be coated, onto which the multilayer coating film may be applied, include automobile body exterior plates, automobile parts, and household electrical appliances, and metal surfaces of the metal base materials, such as the steel sheets, composing them may be subjected to surface treatment such as phosphate treatment, chromate treatment or complex oxide treatment.

Articles, and optionally surface-treated articles, may also have additional coating films formed on them. For example, articles to be coated used as base materials, which are surface treated as necessary, may also have undercoat coating films and/or intermediate coating films formed on them. When the article to be coated is an automobile body, for example, an undercoat coating film and/or intermediate coating film may be formed using a known undercoat and/or intermediate coating composition, that is commonly used for coating of automobile bodies.

An undercoat coating composition used for formation of an undercoat coating film may be an electrodeposition coating, for example, and preferably a cationic electrodeposition coating. An intermediate coating composition for formation of an intermediate coating film may be one obtained by forming a coating material using a base resin such as an acrylic resin, polyester resin, alkyd resin, urethane resin or epoxy resin having a crosslinkable functional group such as a carboxyl or hydroxyl group, and a crosslinking agent such as an amino resin such as a melamine resin or urea resin or an optionally blocked polyisocyanate compound, together with a pigment, thickening agent and other optionally selected components.

The clear coating composition (Z) may be any thermosetting clear coating composition that is known for coating onto automobile bodies and the like. The thermosetting clear coating composition may be, for example, an organic solvent-type thermosetting coating composition, an aqueous thermosetting coating composition or a powder thermosetting coating composition, containing a base resin with a crosslinkable functional group, and a curing agent.

Examples of crosslinkable functional groups in the base resin include carboxyl, hydroxyl, epoxy and silanol groups. Examples of types of resins for the base resin include acrylic resins, polyester resins, alkyd resins, urethane resins, epoxy resins and fluorine resins. Examples for the curing agent include polyisocyanate compounds, blocked polyisocyanate compounds, melamine resins, urea resins, carboxyl group-containing compounds, carboxyl group-containing resins, epoxy group-containing resins and epoxy group-containing compounds.

Preferred base resin/curing agent combinations for the clear coating composition (Z) include carboxyl group-containing resin/epoxy group-containing resins, hydroxyl group-containing resin/polyisocyanate compounds, hydroxyl group-containing resin/blocked polyisocyanate compounds and hydroxyl group-containing resin/melamine resin combinations.

The clear coating composition (Z) may also be a one-pack type coating material, or a multi-pack type coating material such as a two-pack type urethane resin coating material.

The clear coating composition (Z) may also contain, as necessary, color pigments, brightness pigments and/or dyes in ranges that do not impair the transparency, and may further contain, as suitable, extender pigments, ultraviolet absorbers, light stabilizers, antifoaming agents, thickening agents, rust inhibitors, surface conditioners and the like.

The method of coating the clear coating composition (Z) is not particularly restricted, and examples include coating methods such as air spray coating, airless spray coating, rotary atomizing coating and curtain coating, which are coating methods that allow formation of wet coated films. An electrostatic charge may also be applied if necessary in these coating methods. Air spray coating and rotary atomizing coating are especially preferred. The coating amount of the clear coating composition (Z) is usually preferred to be an amount that produces a cured film thickness of 10 to 50 µm and preferably 20 to 40 µm.

When carrying out air spray coating, airless spray coating or rotary atomizing coating, the viscosity of the clear coating composition (Z) is preferably adjusted as appropriate using an organic solvent or other solvent to within a suitable viscosity range for coating, which will usually be a viscosity range of about 15 to 60 seconds and especially 20 to 50 seconds at 20° C., as measured with a No. 4 Ford cup viscometer.

Heating may be carried out by publicly known heating means, using a drying furnace such as an air heating furnace, electric furnace or infrared induction heating furnace, for example. The heating temperature is in the range of preferably 70 to 160° C. and more preferably 90 to 150° C. The heating time is not particularly restricted but is in the range of preferably 10 to 60 minutes and more preferably 20 to 40 minutes.

EXAMPLES

The present invention will now be explained in greater detail using production examples, examples and comparative examples. The production examples, examples and comparative examples are merely for illustration and are not intended to limit the scope of the invention. Throughout the production examples, examples and comparative examples, the "parts" and "%" values are based on mass, unless otherwise specified. The film thicknesses of the coating films are based on the cured coating films.

Production of Hydroxyl Group-Containing Acrylic Resin (A1)

Production Example 1

In a reactor equipped with a thermometer, thermostat, stirrer, reflux condenser, nitrogen inlet tube and dropper there were charged 130 parts of deionized water and 0.52 part of AQUALON KH-10 (trade name of Dai-ichi Kogyo Seiyaku Co., Ltd., emulsifying agent, active ingredient: 97%), and then the mixture was stirred in a nitrogen stream and the temperature was increased to 80° C. Next, 1% of the total monomer emulsion (1) described below and 5.3 parts of a 6% ammonium persulfate aqueous solution were introduced into the reactor, and the mixture was kept at 80° C. for 15 minutes. The remainder of the monomer emulsion (1) was then added dropwise into the reactor kept at the same temperature over a period of 3 hours, and upon completion of the dropwise addition the mixture was aged for 1 hour. Next, the monomer emulsion (2) described below was added dropwise over a period of 1 hour, and after aging for 1 hour, the mixture was cooled to 30° C. while gradually adding 40 parts of a 5% dimethylethanolamine aqueous solution to the reactor, and discharged while filtering with a 100 mesh nylon cloth, to obtain a hydroxyl group-containing acrylic resin emulsion (A1-1) with a solid concentration of 30%. The acid value of the obtained hydroxyl group-containing acrylic resin emulsion (A1-1) was 33 mgKOH/g and the hydroxyl value 25 mgKOH/g.

Monomer emulsion (1): 42 parts deionized water, 0.72 part AQUALON KH-10, 2.1 parts methylenebisacrylamide, 2.8 parts styrene, 16.1 parts methyl methacrylate, 28 parts ethyl acrylate and 21 parts n-butyl acrylate were mixed and stirred to obtain monomer emulsion (1).

Monomer emulsion (2): 18 parts deionized water, 0.31 part AQUALON KH-10, 0.03 part ammonium persulfate, 5.1 parts methacrylic acid, 5.1 parts 2-hydroxyethyl acrylate, 3 parts styrene, 6 parts methyl methacrylate, 1.8 parts ethyl acrylate and 9 parts n-butyl acrylate were mixed and stirred to obtain monomer emulsion (2).

Production Example 2

After placing a mixed solvent of 27.5 parts of methoxypropanol and 27.5 parts of isobutanol in a reactor equipped with a thermometer, thermostat, stirrer, reflux condenser and dropper, and heating to 110° C., 121.5 parts of a mixture comprising 25 parts of styrene, 27.5 parts of n-butyl methacrylate, 20 parts of "Isostearyl acrylate" (trade name of Osaka Organic Chemical Industry, Ltd., branched higher alkyl acrylate), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol and 4 parts of t-butyl peroxyoctanoate was added to the mixed solvent over a period of 4 hours, and then a mixture of 0.5 part of t-butyl peroxyoctanoate and 20 parts of isopropanol was added dropwise over a period of 1 hour. The mixture was then stirred and aged for 1 hour to obtain a hydroxyl group-containing acrylic resin solution (A1-2) with a solid concentration of 50%. The hydroxyl value of the resin was 29 mgKOH/g, the acid value due to phosphate groups was 83 mgKOH/g, and the weight-average molecular weight was 10,000.

Phosphate group-containing polymerizable monomer: After placing 57.5 parts of monobutylphosphoric acid and 41 parts of isobutanol in a reactor equipped with a thermometer, thermostat, stirrer, reflux condenser and dropper and heating them to 90° C., 42.5 parts of glycidyl methacrylate was added dropwise over a period of 2 hours, and the mixture was further stirred and aged for 1 hour. Next, 59 parts of isopropanol was added to obtain a phosphate group-containing polymerizable monomer solution with a solid concentration of 50%. The acid value due to the phosphate groups in the obtained monomer was 285 mgKOH/g.

Production of Hydroxyl Group-Containing Polyester Resin (A2)

Production Example 3

After charging 109 parts of trimethylolpropane, 141 parts of 1,6-hexanediol, 126 parts of hexahydrophthalic anhydride and 120 parts of adipic acid into a reactor equipped with a thermometer, thermostat, stirrer, reflux condenser and water separator, and heating from 160° C. to 230° C. for a period of 3 hours, condensation reaction was conducted at 230° C. for 4 hours. Next, 38.3 parts of trimellitic anhydride was further added for addition of carboxyl groups to the obtained condensation reaction product, reaction was conducted at 170° C. for 30 minutes, and then dilution was performed with 2-ethyl-1-hexanol to obtain a hydroxyl group-containing polyester resin (A2-1) with a solid concentration of 70%. The obtained hydroxyl group-containing polyester resin had an acid value of 46 mgKOH/g, a hydroxyl value of 150 mgKOH/g, a solid concentration of 70% and a weight-average molecular weight of 6,400.

Production Example 4

After adding 118 parts of 1,6-hexanediol and 102 parts of adipic acid into a reactor equipped with a thermometer, stirrer, heating apparatus and rectification column, a small amount of xylene for reflux was further added and the mixture was gradually heated to 250° C. and held for 5 hours at that temperature for esterification reaction, while dehydrating, to obtain a polyester resin. After adding 102.5 parts of ethyleneglycol monobutyl ether and 2.5 parts of orthophosphoric acid to 100 parts of the polyester resin, the mixture was kept at 100° C. for 3 hours to obtain a hydroxyl group-containing polyester resin solution (A2-2) with a solid content of 50%. The number-average molecular weight of the resin was 4,000.

Production of Pigment Dispersions

Production Example 5

In a stirring and mixing container there were uniformly mixed 19 parts of the aluminum pigment paste GX-180A (trade name of Asahi Kasei Metals Co., Ltd., metal content: 74%) (14 parts solid content), 35 parts of 2-ethyl-1-hexanol, 8 parts of the hydroxyl group-containing acrylic resin solution (A1-2) obtained in Production Example 2, and 0.2 part of 2-(dimethylamino)ethanol, to obtain a pigment dispersion (P-1).

Production Example 6

In a stirring and mixing container there were uniformly mixed 19 parts of the aluminum pigment paste GX-180A (trade name of Asahi Kasei Metals Co., Ltd., metal content: 74%) (14 parts solid content), 35 parts of 2-ethyl-1-hexanol, 8 parts of the hydroxyl group-containing polyester resin solution (A2-2) obtained in Production Example 4 and 0.2 part of 2-(dimethylamino)ethanol, to obtain a pigment dispersion (P-2).

Production of Aqueous Coating Compositions

Example 1

After thoroughly mixing 62 parts of the pigment dispersion (P-1) obtained in Production Example 5, 100 parts of the hydroxyl group-containing acrylic resin emulsion (A1-1) obtained in Production Example 1 (solid content: 30 parts), 28.6 parts of the hydroxyl group-containing polyester resin solution (A2-1) obtained in Production Example 3 (solid content: 20 parts), 5 parts of "SANNIX PP-200" (trade name of Sanyo Chemical Industries, Ltd., polyoxypropylene glycol, solid content: 100%, number-average molecular weight: 200, solubility parameter: 11.7) (solid content: 5 parts), 51.7 parts of a melamine resin (C-1) (alkyl etherified melamine resin, (methyl group)/(butyl group) molar ratio: 0/100, solid content: 60%) (solid content: 31 parts) and 28.6 parts of "UCOAT UX-8100" (trade name of Sanyo Chemical Industries, Ltd., urethane emulsion, solid content: 35%) (solid content: 10 parts), there were further added "PRIMAL ASE-60" (trade name of Rohm & Haas, thickening agent), 2-(dimethylamino)ethanol and deionized water, to obtain aqueous coating composition No. 1 having a pH of 8.0, a coating material solid content of 25%, and a viscosity of 40 seconds using a Ford cup No. 4 at 20° C.

Examples 2 to 10 and Comparative Examples 1 to 6

Aqueous coating compositions No. 2 to 16, each having a viscosity of 40 seconds with a No. 4 Ford cup at 20° C., were obtained in the same manner as Example 1, except that the compositions were as listed in Table 1.

TABLE 1

| | | | Example | | | | | | | |
|---|---|---|---|---|---|---|---|---|---|---|
| | | | 1 | 2 | 3 | 4 | 5 | 6 | 7 | 8 |
| Aqueous coating composition No. | | | 1 | 2 | 3 | 4 | 5 | 6 | 7 | 8 |
| Pigment dispersion | Pigment dispersion name | | P-1 | P-1 | P-1 | P-1 | P-2 | P-1 | P-1 | P-1 |
| | One or more hydroxyl group-containing resins (A) selected from among hydroxyl group-containing acrylic resin (A1) and hydroxyl group-containing polyester resin (A2) | Hydroxyl-containing acrylic resin solution (A1-2) | 4 | 4 | 4 | 4 | | 4 | 4 | 4 |
| | | Hydroxyl group-containing polyester resin solution (A2-2) | | | | | 4 | | | |
| | Pigment | "GX-180A" | 14 | 14 | 14 | 14 | 14 | 14 | 14 | 14 |
| One or more hydroxyl group-containing resins (A) selected from among hydroxyl group-containing acrylic resin (A1) and hydroxyl group-containing polyester resin (A2) | | Hydroxyl-containing acrylic resin emulsion(A1-1) | 30 | 30 | 30 | 50 | | 30 | 30 | 30 |
| | | Hydroxyl group-containing polyester resin solution (A2-1) | 20 | 20 | 20 | | 50 | 20 | 20 | 20 |
| Oligomer (B) | | "SANNIX PP200" | 5 | | | | | | | |
| | | "SANNIX GP250" (*1) | | 5 | | | | | | |
| | | "PTMG250" (*2) | | | 5 | 5 | 5 | | | |
| | | "SANNIX PP400" (*3) | | | | | | 5 | | |
| | | "SANNIX GP400" (*4) | | | | | | | 5 | |
| | | "SANNIX GP600" (*5) | | | | | | | | 5 |
| | | "PTMG650" (*6) | | | | | | | | |
| | | "SANNIX PP600" (*7) | | | | | | | | |
| | | "SANNIX PP1000" (*8) | | | | | | | | |
| | | "SANNIX GP1000" (*9) | | | | | | | | |
| | | "PTMG1000" (*10) | | | | | | | | |
| Alkyl etherified melamine resin (C) | | Melamine resin (C-1) | 31 | 31 | 31 | 31 | 31 | 31 | 31 | 31 |
| | | Melamine resin (C-2) (*11) | | | | | | | | |
| | | Melamine resin (C-3) (*12) | | | | | | | | |
| | | Melamine resin (C-4) (*13) | | | | | | | | |
| Urethane emulsion | | "UCOAT UX-8100" | 10 | 10 | 10 | 10 | 10 | 10 | 10 | 10 |

| | | | Example | | Comparative Example | | | | | |
|---|---|---|---|---|---|---|---|---|---|---|
| | | | 9 | 10 | 1 | 2 | 3 | 4 | 5 | 6 |
| Aqueous coating composition No. | | | 9 | 10 | 11 | 12 | 13 | 14 | 15 | 16 |
| Pigment dispersion | Pigment dispersion name | | P-1 | P-1 | P-1 | P-1 | P-1 | P-1 | P-1 | P-1 |
| | One or more hydroxyl group-containing resins (A) selected from among hydroxyl group-containing acrylic resin (A1) and hydroxyl group-containing polyester resin (A2) | Hydroxyl-containing acrylic resin solution (A1-2) | 4 | 4 | 4 | 4 | 4 | 4 | 4 | 4 |
| | | Hydroxyl group-containing polyester resin solution (A2-2) | | | | | | | | |
| | Pigment | "GX-180A" | 14 | 14 | 14 | 14 | 14 | 14 | 14 | 14 |
| One or more hydroxyl group-containing resins (A) selected from among hydroxyl group-containing acrylic resin (A1) and hydroxyl group-containing polyester resin (A2) | | Hydroxyl-containing acrylic resin emulsion(A1-1) | 30 | 30 | 30 | 30 | 30 | 30 | 30 | 30 |
| | | Hydroxyl group-containing polyester resin solution (A2-1) | 20 | 20 | 20 | 20 | 20 | 20 | 20 | 20 |
| Oligomer (B) | | "SANNIX PP200" | | | | | | | | |
| | | "SANNIX GP250" (*1) | | | | | | | | |
| | | "PTMG250" (*2) | | | | 5 | | | 5 | 5 |
| | | "SANNIX PP400" (*3) | | | | | | | | |
| | | "SANNIX GP400" (*4) | | | | | | | | |
| | | "SANNIX GP600" (*5) | | | | | | | | |
| | | "PTMG650" (*6) | 5 | | | | | | | |
| | | "SANNIX PP600" (*7) | | | | | 5 | | | |

TABLE 1-continued

| | | | | | | | | | | |
|---|---|---|---|---|---|---|---|---|---|---|
| | "SANNIX PPI000" (*8) | | | | | 5 | | | | |
| | "SANNIX GP1000" (*9) | | | | | | 5 | | | |
| | "PTMG1000" (*10) | | | | | | | 5 | | |
| Alkyl etherified melamine resin (C) | Melamine resin (C-1) | 31 | | 31 | 31 | 31 | 31 | | | |
| | Melamine resin (C-2) (*11) | | 31 | | | | | | | |
| | Melamine resin (C-3) (*12) | | | | | | | | 31 | |
| | Melamine resin (C-4) (*13) | | | | | | | | | 31 |
| Urethane emulsion | "UCOAT UX-8100" | 10 | 10 | 10 | 10 | 10 | 10 | 10 | 10 | |

Notes (*1) to (*13) in the tables are as follows.
(*1) "SANNIX GP250": trade name of Sanyo Chemical Industries, Ltd., polyoxypropylene glyceryl ether, solid content: 100%, number-average molecular weight: 250, solubility parameter: 13.2,
(*2) "PTMG250": trade name of Mitsubishi Chemical Corp., polyoxytetramethylene glycol, solid content: 100%, number-average molecular weight: 250, solubility parameter: 11.7,
(*3) "SANNIX PP400": trade name of Sanyo Chemical Industries, Ltd., polyoxypropylene glycol, solid content: 100%, number-average molecular weight: 400, solubility parameter: 10.4,
(*4) "SANNIX GP400": trade name of Sanyo Chemical Industries, Ltd., polyoxypropylene glyceryl ether, solid content: 100%, number-average molecular weight: 400, solubility parameter: 11.5,
(*5) "SANNIX GP600": trade name of Sanyo Chemical Industries, Ltd., polyoxypropylene glyceryl ether, solid content: 100%, number-average molecular weight: 600, solubility parameter: 10.6,
(*6) "PTMG650": trade name of Mitsubishi Chemical Corp., polyoxytetramethylene glycol, solid content: 100%, number-average molecular weight: 650, solubility parameter: 10.0,
(*7) "SANNIX PP600": trade name of Sanyo Chemical Industries, Ltd., polyoxypropylene glycol, solid content,: 100%, number-average molecular weight: 600, solubility parameter: 9.8,
(*8) "SANNIX PP1000": trade name of Sanyo Chemical Industries, Ltd., polyoxypropylene glycol, solid content: 100%, number-average molecular weight: 1000, solubility parameter: 9.4,
(*9): "SANNIX GP1000": trade name of Sanyo Chemical Industries, Ltd., polyoxypropylene glyceryl ether, solid content: 100%, number-average molecular weight: 1000, solubility parameter: 9.9,
(*10) "PTMG1000": trade name of Mitsubishi Chemical Corp., polyoxytetramethylene glycol, solid content: 100%, number-average molecular weight: 1000, solubility parameter: 9.7,
(*11) Melamine resin (C-2): alkyl etherified melamine resin, (methyl group)/(butyl group) molar ratio: 30/70, solid content: 75%,
(*12) Melamine resin (C-3): alkyl etherified melamine resin, (methyl group)/(butyl group) molar ratio: 70/30, solid content: 70%,
(*13) Melamine resin (C-4): alkyl etherified melamine resin, (methyl group)/(butyl group) molar ratio: 100/0, solid content: 97%.

Preparation of Intermediate Coating Composition (V)

Intermediate Coating Composition (V-1)

"TP-65-2" (trade name of Kansai Paint Co., Ltd., polyester resin/amino resin-based organic solvent-based coating composition) was used as the intermediate coating composition (V-1).

Intermediate Coating Composition (V-2)

"WP-523H" (trade name of Kansai Paint Co., Ltd., acrylmelamine resin-based aqueous intermediate coating composition) was used as the intermediate coating composition (V-2).

Preparation of Clear Coating Composition (Z)

Clear Coating Composition (Z-1)

"MAGICRON KINO-1210" (trade name of Kansai Paint Co., Ltd., acrylic resin-based organic solvent-type overcoat clear coating composition, base resin/crosslinking agent: combination of carboxyl group-containing resin/epoxy group-containing resin) was used as the clear coating composition (Z-1).

Clear Coating Composition (Z-2)

"MAGICRON KINO-1210" (trade name of Kansai Paint Co., Ltd., acrylic resin-based organic solvent-type overcoat clear coating composition, base resin/crosslinking agent: combination of carboxyl group-containing resin/epoxy group-containing resin) with the amount of the surface conditioner halved was used as the clear coating composition (Z-2).

Fabrication of Test Sheets

Example 11

Fabrication of Test Sheet a for Water-Resistant Adhesiveness Evaluation

A 10 cm×15 cm cold-rolled steel sheet that had been subjected to zinc phosphate treatment was electrodeposited with ELECRON GT-10 (trade name of Kansai Paint Co., Ltd., cationic electrodeposition coating) to a dry film thickness of 20 μm, and was heated at 170° C. for 30 minutes for curing. Next, an intermediate coating composition (V-1) was applied onto the cured electrodeposition coating to a film thickness of 35 μm, and heated for 30 minutes at 140° C. for curing. The aqueous coating composition No. 1 obtained in Example 1 was electrostatically coated onto the cured intermediate coating film to a dry film thickness of 15 μm using a rotary atomizing electrostatic coater, to form an uncured base coating film. After standing for 3 minutes, it was preheated at 80° C. for 3 minutes, and then the uncured base coating film was electrostatically coated with a clear coating composition (Z-1) using a rotary atomizing electrostatic coater to a cured film thickness of 35 μm, forming a clear coating film. After standing for 7 minutes, it was heated at 140° C. for 30 minutes to simultaneously cure the uncured base coating film and uncured clear coating film, to fabricate test sheet A for water-resistant adhesiveness evaluation.

Fabrication of Test Sheet B for Cissing Resistance Evaluation

Test sheet B for cissing resistance evaluation was fabricated in the same manner as for test sheet A, except that in the method of fabricating test sheet A, the 10 cm×15 cm zinc phosphate-treated cold-rolled steel sheet was changed to a 30 cm×45 cm zinc phosphate-treated cold-rolled steel sheet, and the clear coating composition (Z-1) was changed to a clear coating composition (Z-2).

Examples 12 to 20 and Comparative Examples 7 to 12

Test sheets A for water-resistant adhesiveness evaluation and test sheets B for cissing resistance evaluation were fabricated in the same manner as Example 11, except that the aqueous coating composition No. 1 was changed to the aqueous coating compositions listed in Table 2.

Example 21

Fabrication of Test Sheet a for Water-Resistant Adhesiveness Evaluation

A 10 cm×15 cm cold-rolled steel sheet that had been subjected to zinc phosphate treatment was electrodeposited with ELECRON GT-10 (trade name of Kansai Paint Co., Ltd., cationic electrodeposition coating) to a dry film thickness of 20 µm, and was heated at 170° C. for 30 minutes for curing. Next, an intermediate coating composition (V-2) was applied onto the cured electrodeposition coating to a dry film thickness of 20 µm, to form an uncured intermediate coating film. After standing for 7 minutes, the aqueous coating composition No. 1 obtained in Example 1 was electrostatically coated onto the uncured intermediate coating film to a dry film thickness of 15 µm using a rotary atomizing electrostatic coater, to form an uncured base coating film. After standing for 3 minutes, it was preheated at 80° C. for 3 minutes, and then the uncured base coating film was electrostatically coated with a clear coating composition (Z-1) using a rotary atomizing electrostatic coater to a cured film thickness of 35 µm, forming a clear coating film. After standing for 7 minutes, it was heated at 140° C. for 30 minutes to simultaneously cure the uncured intermediate coating film, the uncured base coating film and the uncured clear coating film, to fabricate test sheet A for water-resistant adhesiveness evaluation.

Fabrication of Test Sheet B for Cissing Resistance Evaluation

Test sheet B for cissing resistance evaluation was fabricated in the same manner as for test sheet A, except that in the method of fabricating test sheet A, the 10 cm×15 cm zinc phosphate-treated cold-rolled steel sheet was changed to a 30 cm×45 cm zinc phosphate-treated cold-rolled steel sheet, and the clear coating composition (Z-1) was changed to a clear coating composition (Z-2).

Examples 22 to 30 and Comparative Examples 13 to 18

Test sheets A for water-resistant adhesiveness evaluation and test sheets B for cissing resistance evaluation were fabricated in the same manner as Example 21, except that the aqueous coating composition No. 1 was changed to the aqueous coating compositions listed in Table 3.

Each of the obtained test sheets was evaluated by the following test methods. The evaluation results are shown in Table 2 and Table 3.

(Test Methods)

Water-Resistant Adhesiveness

Each obtained test sheet A was immersed for 240 hours in hot water at 40° C., raised up, and dried for 12 hours at 20° C., after which 100 2 mm×2 mm square grids were formed on the surface of the coating film according to JIS K 5600-5-6(1990), and adhesive tape was attached to the surface and abruptly peeled off, and subsequently the number of square grids with coating film remaining on the coated surface was evaluated. Scores of VG and G are acceptable.

VG: Remaining squares/total squares=100/100 with no edge chipping

G: Remaining squares/total squares=100/100 with edge chipping

F: Number of remaining squares/total number of squares=99-90/100

P: Number of remaining squares/total number of squares=89/100.

Cissing Resistance

Each obtained test sheet B was visually observed and evaluated on the following scale. Scores of VG and G are acceptable.

VG: No cratering or cissing on coating surface

G: Small cratering observed on coating surface, but not of a problematic level

F: Several large craters observed on coating surface, of a problematic level for practical use P: Cissing observed reaching to basis material, across the entire coating surface.

TABLE 2

| | | Intermediate coating composition | Aqueous coating composition No. | Evaluation results | |
|---|---|---|---|---|---|
| | | | | Water-resistant adhesiveness | Cissing resistance |
| Example | 11 | V-1 | 1 | VG | VG |
| | 12 | V-1 | 2 | VG | VG |
| | 13 | V-1 | 3 | VG | VG |
| | 14 | V-1 | 4 | G | G |
| | 15 | V-1 | 5 | G | G |
| | 16 | V-1 | 6 | VG | G |
| | 17 | V-1 | 7 | VG | VG |
| | 18 | V-1 | 8 | VG | G |
| | 19 | V-1 | 9 | VG | G |
| | 20 | V-1 | 10 | G | VG |
| Comparative Example | 7 | V-1 | 11 | VG | F |
| | 8 | V-1 | 12 | VG | P |
| | 9 | V-1 | 13 | VG | P |
| | 10 | V-1 | 14 | VG | P |
| | 11 | V-1 | 15 | F | VG |
| | 12 | V-1 | 16 | P | VG |

TABLE 3

| | | Intermediate coating composition | Aqueous coating composition No. | Evaluation results | |
|---|---|---|---|---|---|
| | | | | Water-resistant adhesiveness | Cissing resistance |
| Example | 21 | V-2 | 1 | VG | VG |
| | 22 | V-2 | 2 | VG | VG |
| | 23 | V-2 | 3 | VG | VG |
| | 24 | V-2 | 4 | G | G |
| | 25 | V-2 | 5 | G | G |
| | 26 | V-2 | 6 | VG | G |
| | 27 | V-2 | 7 | VG | VG |
| | 28 | V-2 | 8 | VG | G |
| | 29 | V-2 | 9 | VG | G |
| | 30 | V-2 | 10 | G | VG |

TABLE 3-continued

|  |  | Intermediate coating composition | Aqueous coating composition No. | Evaluation results | |
|---|---|---|---|---|---|
|  |  |  |  | Water-resistant adhesiveness | Cissing resistance |
| Comparative | 13 | V-2 | 11 | VG | F |
| Example | 14 | V-2 | 12 | VG | P |
|  | 15 | V-2 | 13 | VG | P |
|  | 16 | V-2 | 14 | VG | P |
|  | 17 | V-2 | 15 | P | VG |
|  | 18 | V-2 | 16 | P | VG |

Embodiments and Examples of the invention were described above, but the invention is not limited to these embodiments and may incorporate various modifications based on the technical concept of the invention. For example, the constructions, methods, steps, forms, materials and numerical values mentioned for the embodiments and Examples server merely for illustration, and different constructions, methods, steps, forms, materials and numerical values may be used as necessary. The constructions, methods, steps, forms, materials and numerical values of the embodiment described above may also be combined together, so long as the gist of the invention is maintained.

The invention claimed is:

1. A method for forming a multilayer coating film, comprising applying an aqueous coating composition onto an article to be coated comprising an exterior plate of automobile body or an automobile part to form a base coating film, and applying a clear coating composition (Z) on the base coating film to form a clear coating film, the aqueous coating composition comprising (A) one or more hydroxyl group-containing resins selected from the group consisting of (A1) hydroxyl group-containing acrylic resins and (A2) hydroxyl group-containing polyester resins, (B) an oligomer and (C) an alkyl etherified melamine resin, wherein
the oligomer (B) has a number-average molecular weight in the range of 200 to 800 and a solubility parameter in the range of 10.0 to 13.5, and
the molar ratio of methyl groups and butyl groups in the alkyl etherified melamine resin (C) is 50/50 to 0/100 as the (methyl group)/(butyl group) molar ratio.

2. The method of claim 1, wherein the number-average molecular weight of the oligomer (B) in the aqueous coating composition is in the range of 200 to 500.

3. The method of claim 1, wherein the solubility parameter of the oligomer (B) in the aqueous coating composition is in the range of 10.7 to 13.5.

4. The method of claim 2, wherein the solubility parameter of the oligomer (B) in the aqueous coating composition is in the range of 10.7 to 13.5.

5. The method of claim 1, wherein the molar ratio of methyl groups and butyl groups in the alkyl etherified melamine resin (C) in the aqueous coating composition is 30/70 to 0/100 as the (methyl group)/(butyl group) molar ratio.

6. The method of claim 2, wherein the molar ratio of methyl groups and butyl groups in the alkyl etherified melamine resin (C) in the aqueous coating composition is 30/70 to 0/100 as the (methyl group)/(butyl group) molar ratio.

7. The method of claim 3, wherein the molar ratio of methyl groups and butyl groups in the alkyl etherified melamine resin (C) in the aqueous coating composition is 30/70 to 0/100 as the (methyl group)/(butyl group) molar ratio.

8. The method of claim 4, wherein the molar ratio of methyl groups and butyl groups in the alkyl etherified melamine resin (C) in the aqueous coating composition is 30/70 to 0/100 as the (methyl group)/(butyl group) molar ratio.

9. The method according to claim 1, wherein the article to be coated by the aqueous coating composition comprises an undercoat coating film and/or an intermediate coating film.

10. The method according to claim 1, comprising coating the aqueous coating composition the article to be coated by air spray coating, airless spray coating, rotary atomizing coating, or curtain coating.

11. A method for forming a multilayer coating film, comprising applying an aqueous coating composition onto an article to be coated to form a base coating film by air spray coating, airless spray coating, rotary atomizing coating, or curtain coating, and applying a clear coating composition (Z) on the base coating film to form a clear coating film, the aqueous coating composition comprising (A) one or more hydroxyl group-containing resins selected from the group consisting of (A1) hydroxyl group-containing acrylic resins and (A2) hydroxyl group-containing polyester resins, (B) an oligomer and (C) an alkyl etherified melamine resin, wherein
the oligomer (B) has a number-average molecular weight in the range of 200 to 800 and a solubility parameter in the range of 10.0 to 13.5, and
the molar ratio of methyl groups and butyl groups in the alkyl etherified melamine resin (C) is 50/50 to 0/100 as the (methyl group)/(butyl group) molar ratio.

12. The method of claim 11, wherein the number-average molecular weight of the oligomer (B) in the aqueous coating composition is in the range of 200 to 500.

13. The method of claim 11, wherein the solubility parameter of the oligomer (B) in the aqueous coating composition is in the range of 10.7 to 13.5.

14. The method of claim 12, wherein the solubility parameter of the oligomer (B) in the aqueous coating composition is in the range of 10.7 to 13.5.

15. The method of claim 11, wherein the molar ratio of methyl groups and butyl groups in the alkyl etherified melamine resin (C) in the aqueous coating composition is 30/70 to 0/100 as the (methyl group)/(butyl group) molar ratio.

16. The method of claim 12, wherein the molar ratio of methyl groups and butyl groups in the alkyl etherified melamine resin (C) in the aqueous coating composition is 30/70 to 0/100 as the (methyl group)/(butyl group) molar ratio.

17. The method of claim 13, wherein the molar ratio of methyl groups and butyl groups in the alkyl etherified melamine resin (C) in the aqueous coating composition is 30/70 to 0/100 as the (methyl group)/(butyl group) molar ratio.

18. The method of claim 14, wherein the molar ratio of methyl groups and butyl groups in the alkyl etherified melamine resin (C) in the aqueous coating composition is 30/70 to 0/100 as the (methyl group)/(butyl group) molar ratio.

19. The method according to claim 11, wherein the article to be coated by the aqueous coating composition comprises an undercoat coating film and/or an intermediate coating film.

* * * * *